J. OLIVER.
CHILLS FOR CASTING MOLD-BOARDS.
No. 6,896. Reissued Feb. 1, 1876.
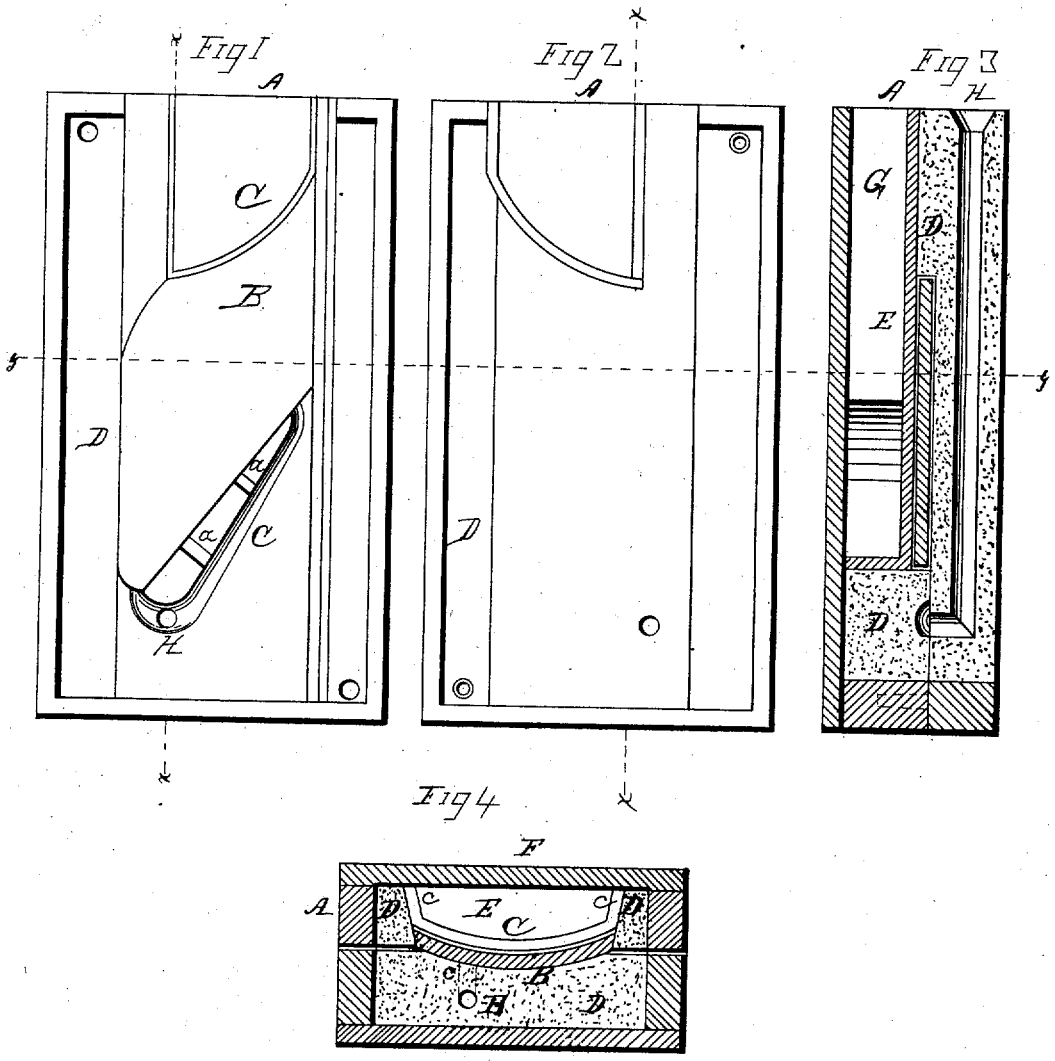
WITNESSES.
Walter Miller
Wm. Ewart
INVENTOR.
James Oliver
By Legget & Legget
Attorneys
N. PETERS, PHOTO-LITHOGRAPHER, WASHINGTON, D. C.

UNITED STATES PATENT OFFICE.

JAMES OLIVER, OF SOUTH BEND, INDIANA.

IMPROVEMENT IN CHILLS FOR CASTING MOLD-BOARDS.

Specification forming part of Letters Patent No. 76,652, dated April 14, 1868; reissue No. 5,828, dated April 7, 1874; reissue No. 6,896, dated February 1, 1876; application filed August 14, 1875.

DIVISION A.

*To all whom it may concern:*

Be it known that I, JAMES OLIVER, of South Bend, county of St. Joseph, State of Indiana, have invented certain new and useful Improvements in Casting Mold-Boards for Plows.

My invention consists in the device employed in producing the mold-boards, as hereinafter more fully described and claimed; and I do hereby declare the following to be a full, clear, and exact description thereof, such as will enable others skilled in the arts to which my invention relates to make and use it, reference being had to the accompanying drawings, which form a part of this specification.

In the drawings, Figure 1 represents one part of the open flask, with the pattern resting on the chill. Fig. 2 represents the other part of the flask, as seen when taken from the pattern, or when the parts of the flask are separated. Fig. 3 is a longitudinal section through lines *x x* of Figs. 1 and 2. Fig. 4 is a transverse section through lines *y y*.

A represents the flask, composed of two parts—the cope and drag. B represents the mold-board pattern, constructed to conform to the shape of the mold-board to be made. C represents the chill, the face of which is curved to correspond to the shape of the face of the pattern, one end and the sides *c* of the said chill extending outward to form a chamber, E, of metal, which is closed by cover F opposite to the chill, and the end G of the chamber is left open.

In casting the pattern B is placed upon the chill C, the spaces D filled with sand, the pattern removed, and the sprue-hole H and the gate *a* formed in any known or convenient manner.

It will be seen that the edges and one face of the mold are made of sand, and the other or remaining face is the chill. The chamber E is then filled with hot or boiling water, after which the molten metal is poured in through the sprue-hole H, and enters the space formed by the pattern through the gate *a*. The sand in the flask is naturally damp, and the dampness, coming in contact with the chill, rusts it, and also condenses upon the face of the chill, so that, were the metal to come in contact with the chill while in this condition, dampness would cause a flickering or disturbance of the molten metal, which, if cooled in this condition, would make a rough, uneven surface on the face of the mold-board; and, further, were the chill cold in casting thin articles like the mold-board, requiring a large chilled surface, the molten metal would commence to cool before it covered the entire surface of the chill, and make an imperfect casting.

To remedy this I first fill the chamber, of which the chill forms a part, with hot or boiling water, which heats the chill and absorbs the dampness, so that when the molten metal is poured in, there being no dampness, the metal flows evenly and smoothly over the surface of the chill, which gives an even and smooth surface to the face of the mold-board, which cannot be done by the old method of casting mold-boards. The water also assists in absorbing the heat from the melted iron, thereby keeping the chill comparatively cool, and hence assists in hardening the casting. When the castings are taken from the mold they are treated by the process described in another division of this application.

Having fully described my invention, what I claim as new, and desire to secure by Letters Patent, is—

The combination of a chill, having an upturned flange on either of its sides, with the cover of the flask, whereby a large free opening is formed in the end of the flask for the escape of steam from contained water during the process of casting, substantially as set forth.

JAMES OLIVER.

Witnesses:
W. G. GEORGE,
E. R. FARNAM.